United States Patent
Pawar et al.

(10) Patent No.: US 10,178,554 B2
(45) Date of Patent: Jan. 8, 2019

(54) SYSTEM AND METHOD FOR DATA OFFLOADING IN A HETNET

(71) Applicant: RELIANCE JIO INFOCOMM LIMITED, Mumbai (IN)

(72) Inventors: Anil Pawar, Navi Mumbai (IN); Sagar Mishra, Navi Mumbai (IN)

(73) Assignee: RELIANCE JIO INFOCOM LIMITED, Mumbai (IN)

( * ) Notice: Subject to any disclaimer, the term of this patent is extended or adjusted under 35 U.S.C. 154(b) by 0 days.

(21) Appl. No.: 15/821,441

(22) Filed: Nov. 22, 2017

(65) Prior Publication Data
US 2018/0146375 A1    May 24, 2018

(30) Foreign Application Priority Data
Nov. 24, 2016 (IN) .............................. 201621040185

(51) Int. Cl.
*H04W 12/06* (2009.01)
*H04W 8/08* (2009.01)
*H04W 28/02* (2009.01)
*H04W 28/08* (2009.01)
*H04W 36/22* (2009.01)
*H04W 48/08* (2009.01)
H04W 24/02 (2009.01)

(52) U.S. Cl.
CPC ............ *H04W 12/06* (2013.01); *H04W 8/08* (2013.01); *H04W 28/0289* (2013.01); *H04W 28/08* (2013.01); *H04W 36/22* (2013.01); *H04W 48/08* (2013.01); *H04W 24/02* (2013.01)

(58) Field of Classification Search
CPC ..... H04W 88/08; H04W 12/12; H04W 84/00; H04W 12/08; H04W 28/0215; H04W 28/0289
See application file for complete search history.

(56) References Cited

U.S. PATENT DOCUMENTS

| 7,907,714 | B2 * | 3/2011 | Baniak | H04M 3/42153 379/201.02 |
| 2014/0153489 | A1 * | 6/2014 | Perras | H04W 60/00 370/328 |
| 2015/0024737 | A1 * | 1/2015 | Fox | H04L 41/5025 455/425 |

(Continued)

*Primary Examiner* — Diane Mizrahi
(74) *Attorney, Agent, or Firm* — Ladas & Parry, LLP (57) ABSTRACT

Embodiments of the present disclosure relate to systems and methods for offloading data of a subscriber from a first radio access technology type to a second radio access technology type. Embodiments may relate to a method comprising: receiving an access request from an access point based on a connection request received from a user equipment, transmitting an authentication request to the user equipment to authenticate a subscriber; receiving an access point name and packet gateway identifier from the home subscriber server; altering the access point name received from the home subscriber server; transmitting the connection request to a packet gateway for authorizing the subscriber for offloading, updating the APN name and the packet gateway identifier at the home subscriber server; and offloading the data from the first radio access technology type to the second radio access technology type, wherein the data is identified based on the subscriber profile.

11 Claims, 4 Drawing Sheets

(56) References Cited

U.S. PATENT DOCUMENTS

| | | | |
|---|---|---|---|
| 2015/0271182 A1* | 9/2015 | Givoni | H04L 63/10 |
| | | | 726/4 |
| 2017/0019750 A1* | 1/2017 | Palanisamy | H04W 4/005 |
| 2017/0251385 A1* | 8/2017 | Fox | H04W 24/02 |

* cited by examiner

SYSTEM AND METHOD FOR DATA OFFLOADING IN A HETNET

CROSS-REFERENCE TO RELATED APPLICATION

This application claims the benefit of and priority to Indian Patent Application No. 201621040185 filed on Nov. 24, 2016, the disclosure of which is hereby incorporated herein by reference in its entirety.

TECHNICAL FIELD

Embodiments of the present disclosure generally relate to communication systems. In particular, embodiments of the present disclosure relate to systems and methods for offloading a data form one type of radio access technology to another.

BACKGROUND

With the augmentation of technology in the recent years, the IEEE 802.11 based standard such as Wi-Fi technology has undergone tremendous growth and shifts. Now-a-days, most of the user equipments (UE) available in the market are not only equipped with cellular functionality but also with Wi-Fi as default in order to connect to the Wi-Fi networks operating in either of the unlicensed frequency bands, 2.4 GHz, or 5 GHz. The versatile character of the user equipments, these days, is acting as driving force to the cellular operators to use ubiquitous and cost-effective Wi-Fi technology in pursuing the HetNet strategy. Accordingly, many operators are now deploying low powered Wi-Fi cells along with cellular small cells at multiple strategic locations identified for a HetNet.

In a conventional cellular deployment environment, suitable powered macrocells are being deployed to cover sufficiently large areas. However, deployment of the macrocells in, isolations, may lead to quick degradation of capacity since the number of user equipment (UE) operating in the macrocells coverage areas have increased.

Therefore, operators are now reinforcing the macrocells deployment with one or more Wi-Fi cells placed at multiple strategic locations within one or more macro coverage areas. This kind of reinforced cellular network is generally termed as Heterogeneous network, in short, HetNet. For a typical HetNet, strategic locations for small cells generally include areas with high density of users, such as shopping malls, airports, railway/bus stations, colleges, etc. Also, these locations might include area with dead-spots, or areas with low macro signal strength, such as indoor establishments or peripheral locations of a macro coverage area. Supplemented with small cells placed at multiple strategic locations, HetNets do not only provide the increased mobile data capacity, but also provide better mobile coverage, thereby enhancing the overall mobile broadband experience.

In a typical heterogeneous network (HetNet), the HetNet comprises a macro base station for providing wide area coverage to serves users. Within the macro cell, several low power nodes, such as micro cells, are employed in service areas having a higher density of users requiring high data rates are denoted. Further, the micro cell integrated with the Wi-Fi radio are also used widely to provide multi-technology hotspot capacity/coverage goals. The operators may also deploy independent and cost-effective Wi-Fi Access points in hotspot areas to offload cellular load, and to meet capacity/coverage requirements of the users. In the HetNet, the macro base station coverage could be used for wide area overlay mobility coverage, while Micro base stations along with Wi-Fi Access points coverage may be used for mobile capacity upgrade. The 3GPP standard defines two types of access; trusted and untrusted non-3GPP access. Non-3GPP access includes access from for instance Wi-Fi, WiMAX, fixed and CDMA networks. Trusted non-3GPP Wi-Fi access was first introduced with the LTE standard in 3GPP Release 8 (2008). Further, the trusted access is often assumed to be an operator-built Wi-Fi access with encryption in the Wi-Fi Radio access network (RAN) and a secure authentication method. In a trusted access, the device (UE) is connected through a TWAG (Trusted Wireless Access Gateway) in the Wi-H core. The TWAG is in turn connected directly with the P-GW (Packet gateway [144]) in the Evolved Packet Core (EPC) through a secure tunnel (GTP, MIP or PMIP). Currently, the telecom service operators are looking for a green field deployment of trusted VoWiFi solution for prioritizing the data services through the trusted Wi-Fi environment for sparing the LTE spectrum resources. In general, cellular operators or the Internet Service Providers (ISPs) incur substantially lesser costs in setting up Wi-Fi access infrastructure compared to mobile broadband networks like 2G/3G/4G.

These days, a seamless environment of data offload between Wi-Fi & LTE is not supported by the outgoing ecosystem of the user equipment or even a handover from LTE to Wi-Fi as prescribed in standard TS 23.402. Further, there exist challenges in an event the radio bearer is deleted for a LTE session and the UE is presents in LTE network, while the UE still tries to establish to the radio bearer again which causes the UE to toggle between both Wi-Fi and the LTE network. Therefore, in view of the above shortcomings in the existing known solutions, there is a need for a system and method which allow offloading or handover of data from the LTE to the Wi-Fi without incurring any toggle of network between the Wi-Fi and the LTE.

SUMMARY

This section is provided to introduce certain aspects of the present disclosure in a simplified form that are further described below in the detailed description. This summary is not intended to identify the key features or the scope of the claimed subject matter.

Embodiments of the present disclosure may relate to a method for offloading data of a subscriber from a first RAT type to a second RAT type, the method being performed by a network entity, the method comprising: receiving an access request, by an AP Gateway, from an access point, wherein the access request is received, by the access point, based on a connection request received from a user equipment, and the access request and the connection request comprise at least one subscriber identifier. Further, the method comprising step of transmitting the at least one subscriber identifier, by the AP Gateway, to an authentication server for fetching a subscriber profile and at least one authentication vector, wherein the authentication server comprises an authentication server address; transmitting an authentication request, by the authentication server, to the user equipment for authenticating the subscriber. Furthermore, the method involves updating at least one of the subscriber profile and the authentication server address, by the authentication server, at a home subscriber server based on a positive authentication of the subscriber; receiving an APN name and packet gateway identifier, by the authentication server, from the home subscriber server; altering the APN name, to form a modified APN name, received from the home subscriber server based on the positive authentication of the subscriber; transmitting the connection request to a packet gateway, by the AP Gateway, for authorizing the subscriber for offloading, wherein the connection request comprises the modified APN name received from the authentication server; updating the APN name and the packet gateway identifier, by the authentication server, at the home subscriber server; and offloading the data from the first RAT type to the second RAT type, wherein the data is identified based on the subscriber profile.

Embodiments of the present disclosure may relate to a network entity for offloading data a subscriber from a first RAT type to a second RAT type, the network entity comprising: an AP Gateway configured to: receive an access request from an access point, wherein the access request is received based on a connection request received from a user equipment, and the access request and the connection request comprise at least one subscriber identifier, transmit the at least one subscriber identifier to an authentication server for fetching a subscriber profile and at least one authentication vector, wherein the authentication server comprises an authentication server address. Further, the network entity comprising the authentication server configured to: transmit an authentication request to the user equipment for authenticating the subscriber, update at least one of the subscriber profile and the authentication server address at a home subscriber server based on a positive authentication of the subscriber, receiving an APN name and a packet gateway identifier from the home subscriber server, and alter the APN name, to form a modified APN name, received from the home subscriber server based on the positive authentication of the subscriber; the AP gateway further configured to transmit the connection request to a packet gateway for authorizing the subscriber for offloading, wherein the connection request comprises the modified APN name received from the authentication server; and the authentication server further configured to update the APN name and the packet gateway identifier, at the home subscriber server, wherein the data is offloaded from the first RAT type to the second RAT type based on the subscriber profile.

Embodiments of the present disclosure may relate to a method for offloading data of a subscriber from a first RAT type to a second RAT type, the method being performed by a user equipment, the method comprising: transmitting a connection request, to the AP Gateway, wherein the connection request is transmitted via an access point, and the connection request comprises at least one subscriber identifier; enabling the AP Gateway to transmit the at least one subscriber identifier to an authentication server for fetching a subscriber profile and at least one authentication vector, wherein the authentication server comprises an authentication server address; enabling the authentication server to transmit an authentication request to the user equipment for authenticating the subscriber; enabling the authentication server to update at least one of the subscriber profile and the authentication server address at a home subscriber server based on a positive authentication of the subscriber; enabling the authentication server to receive an APN name and a packet gateway identifier from the home subscriber server; enabling the authentication server to alter the APN name, to form a modified APN name, received from the home subscriber server based on the positive authentication of the subscriber; enabling the AP Gateway to transmit the connection request to a packet gateway for authorizing the subscriber for offloading, wherein the connection request comprises the modified APN name received from the authentication server; enabling the authentication server to update the APN name and the packet gateway identifier at the home subscriber server; and offloading the data from the first RAT type to the second RAT type, wherein the data is identified based on the subscriber profile.

Embodiments of the present disclosure may relate to a user equipment for offloading data of a subscriber from a first RAT type to a second RAT type, the user equipment configured to: transmit a connection request, to the AP Gateway, wherein the connection request is transmitted via an access point, and the connection request comprises at least one subscriber identifier; enable the AP Gateway to transmit the at least one subscriber identifier to an authentication server for fetching a subscriber profile and at least one authentication vector, wherein the authentication server comprises an authentication server address; enable the authentication server to transmit an authentication request to the user equipment for authenticating the subscriber; enable the authentication server to update at least one of the subscriber profile and the authentication server address at a home subscriber server based on a positive authentication of the subscriber;

enable the authentication server to receive an APN name and a packet gateway identifier from the home subscriber server; enable the authentication server to alter the APN name, to form a modified APN name, received from the home subscriber server based on the positive authentication of the subscriber; enable the AP Gateway to transmit the connection request to a packet gateway for authorizing the subscriber for offloading, wherein the connection request comprises the modified. APN name received from the authentication server; enable the authentication server to update the APN name and the packet gateway identifier at the home subscriber server; and offload the data from the first RAT type to the second RAT type, wherein the data is identified based on the subscriber profile.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Also, the embodiments shown in the figures are not to be construed as limiting the disclosure, but the possible variants of the method and system according to the disclosure are illustrated herein to highlight the advantages of the disclosure. It will be appreciated by those skilled in the art that disclosure of such drawings includes disclosure of electrical components or circuitry commonly used to implement such components.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

The present disclosure encompasses systems and methods for offloading data of a subscriber from a first radio access technology (RAT) type to a second RAT type, wherein the system primarily comprises a user equipment, an access point and a network entity. More particularly, the present disclosure relates to systems and methods for offloading the data from the first RAT type to the second RAT type, wherein one the network entity and the user equipment performs the data offloading.

As used herein, the first RAT type belongs to a 3GPP based access service such as LTE service, whereas the second RAT type belongs to non-3GPP based access service such as Wi-Fi services. Further, the first RAT type service may be provided to user equipment through the Radio access network and the second RAT type service may be provided to user equipment through the Wi-Fi network formed by the access point.

As used herein, the network entity is an entity that serves a cellular network for providing voice services (calls) and the data services to the user equipment. The network entity may include, but not limited to, a base station controller, a base transceiver station, a cell site, a Node B, an eNode B, a radio network controller, and any such entity obvious to a person skilled in the art.

As used herein, the user equipment is a computing device that is latched to the network entity and thus, receives voice and data services from the network entity. Further, the user equipment may get connected to access point for availing the voice and data services. The user equipment may have a processor, a display, a memory and an input mean such as a hard keypad and/or a soft keypad. The user equipment may include, but not limited to, a mobile phone, a tablet, a wearable device, a phablet, a personal digital assistance and any such device obvious to a person skilled in the art.

Figure 1:
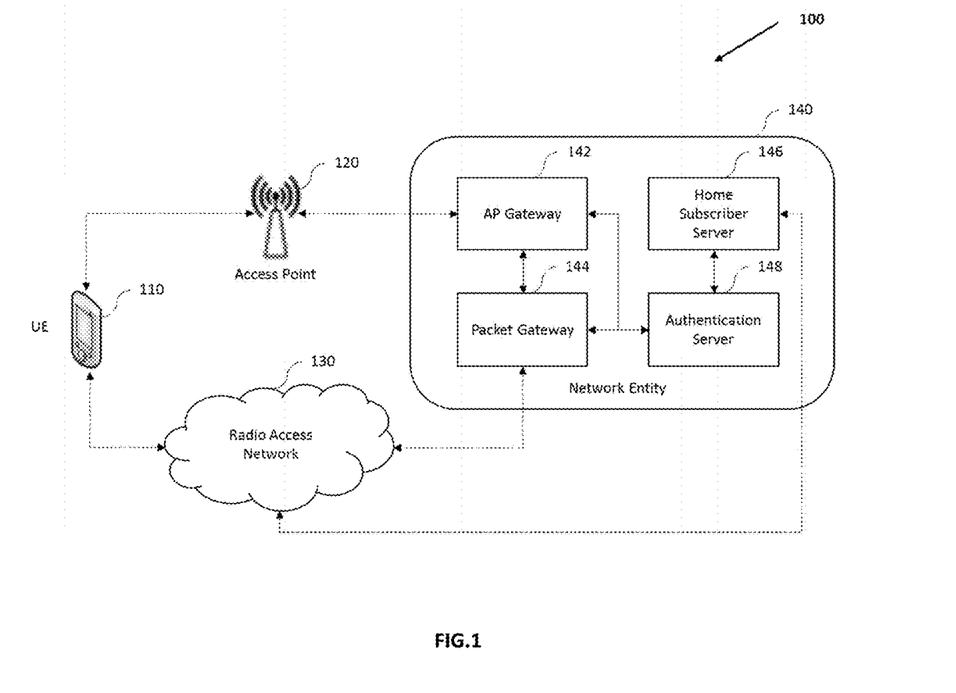
FIG. 1 illustrates a simplified system architecture [100] for offloading data of a subscriber from a first RAT type to a second RAT type, in accordance with an embodiment of the present disclosure.

As illustrated in FIG. 1, the present disclosure encompasses an exemplary system architecture for offloading data of a subscriber from the RAT type to a second RAT type. The system architecture comprises a user equipment [110] and a network entity [140]. Further, the system architecture comprises a Radio access network [130] and an access point [120]/Wi-Fi network for establishing a communication between the user equipment [110] and the network entity [140], wherein the access point [120] network is formed by the access point [120]. Furthermore, the network entity [140], as used herein, comprises an AP Gateway [142], a packet gateway [144], a home subscriber server [146] and an authentication server [148]. The network entity [140] may provide a cellular network to the one or more user equipments [110] present in a cellular coverage range of the network entity [140] and thereby, the one or more user equipments [110] may avail voice and data services using the cellular network.

In one embodiment of the present disclosure, the network entity [140] performs the data offloading from the first RAT type to the second RAT type. More particularly, the AP Gateway [142] of the network entity [140] may be configured to receive an access request from an access point [120], wherein the access request is received based on a connection request received from a user equipment [110], and the access request and the connection request comprise at least one subscriber identifier, transmit the at least one subscriber identifier to an authentication server [148] for fetching a subscriber profile and at least one authentication vector, wherein the authentication server [148] comprises an authentication server [148] address. Furthers, the authentication server [148] configured to transmit an authentication request to the user equipment [110] for authenticating the subscriber, wherein the authentication request comprises a payload data, the subscriber profile and the at least one authentication vector followed by updating at least one of the subscriber profile and the authentication server [148] address at a home subscriber server [146] based on a positive authentication of the subscriber, the authentication request comprises a payload data, the subscriber profile and the at least one authentication vector receiving an APN name and a packet gateway [144] identifier from the home subscriber server [146], and alter the APN name, to form a modified APN name, received from the home subscriber server [146] based on the positive authentication of the subscriber. Furthermore, the AP Gateway [142] further configured to transmit the connection request to a packet gateway [144] for authorizing the subscriber for offloading, wherein the connection request comprises the modified APN name received from the authentication server [148]; and the authentication server [148] further configured to update the APN name and the packet gateway [144] identifier, at the home subscriber server [146], wherein the data is offloaded from the first RAT type to the second RAT type based on the subscriber profile.

In another embodiment of the present disclosure, the user equipment [110] may be configured to perform the data offloading from the first RAT type to the second RAT type. The user equipment [110] may be configured to transmit a connection request, to the AP Gateway [142], wherein the connection request is transmitted via an access point [120], and the connection request comprises at least one subscriber identifier. Further, the user equipment [110] may be configured to enable the AP Gateway [142] to transmit the at least one subscriber identifier to an authentication server [148] for fetching a subscriber profile and at least one authentication vector, wherein the authentication server [148] comprises an authentication server [148] address; enable the authentication server [148] to transmit an authentication request to the user equipment [110] for authenticating the subscriber; enable the authentication server [148] to update at least one of the subscriber profile and the authentication server [148] address at a home subscriber server [146] based on a positive authentication of the subscriber. Moreover, the user equipment [110] may be configured to enable the authentication server [148] to receive an APN name and a packet gateway [144] identifier from the home subscriber server [146]; enable the authentication server [148] to alter the APN name, to form a modified APN name, received from the home subscriber server [146] based on the positive authentication of the subscriber; enable the AP Gateway [142] to transmit the connection request to a packet gateway [144] for authorizing the subscriber for offloading, wherein the connection request comprises the modified APN name received from the authentication server [148]; enable the authentication server [148] to update the APN name and the packet gateway [144] identifier at the home subscriber server [146]; and offload the data from the first RAT type to the second RAT type, wherein the data is identified based on the subscriber profile.

Figure 2:
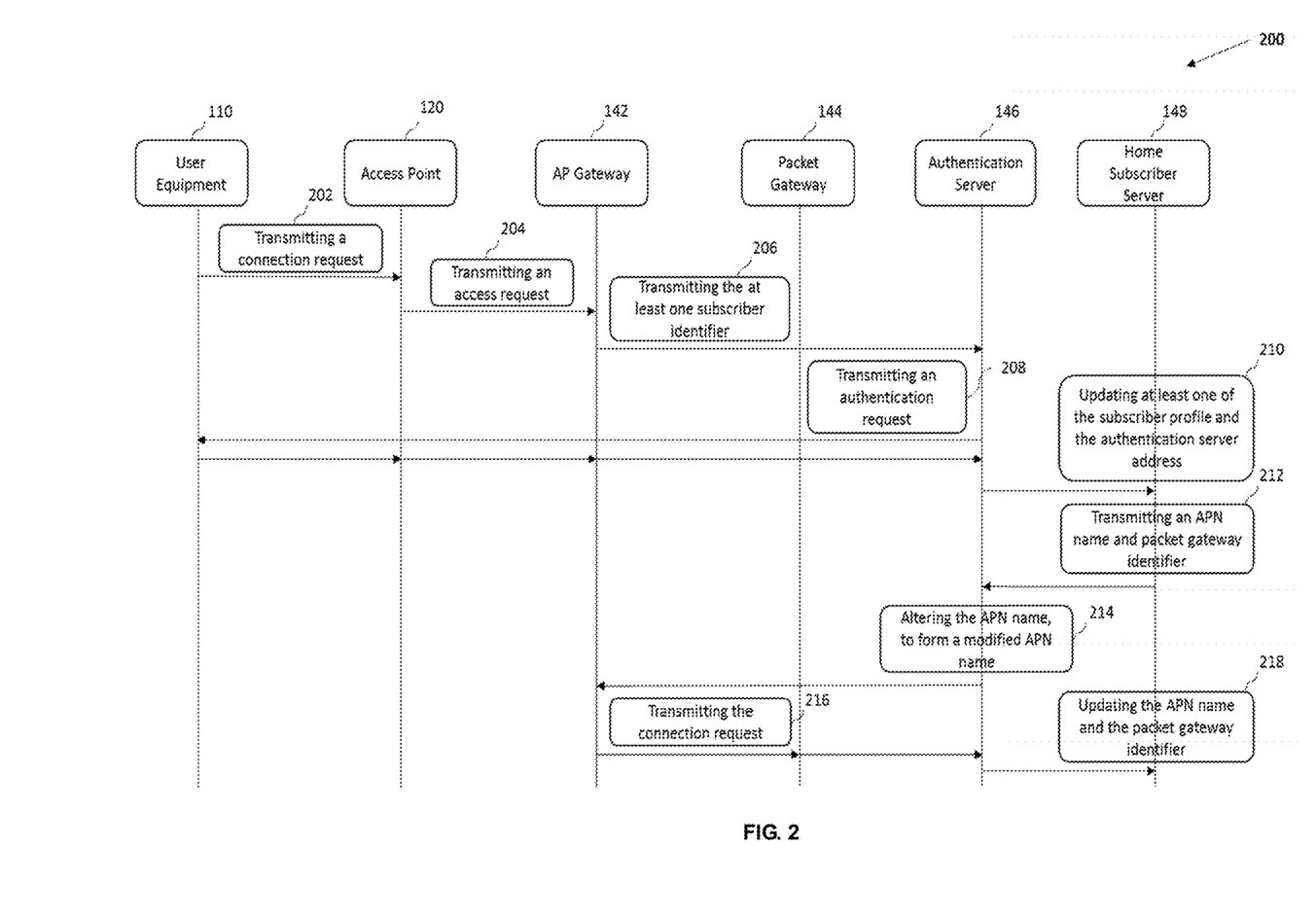
FIG. 2 illustrates an exemplary signaling flow diagram [200] for offloading data of a subscriber from a first RAT type to a second RAT type, in accordance with an embodiment of the present disclosure.

As illustrated in FIG. 2, the present disclosure illustrates an exemplary signaling flow diagram [200] for offloading data of a subscriber from a first RAT type to a second RAT type, in accordance with an embodiment of the present disclosure. At step 202, the user equipment [110] transmits a connection request, for association with the access point [120]. The association is based on SSID configured for EAP-AKA, wherein the EAP-AKA based authentication, by the access point [120], requires permanent identity (at least one subscriber identifier) of the user equipment [110]. Further, the user equipment [110] replies with the permanent identity such as international subscriber identity module (IMSI) stored at the subscriber identity module (SIM).

At step 204, the access point [120] transmits an access request to the access point [120] (AP) gateway, wherein the access request includes, but not limited to, details such as User-Name, EAPIdentity, Acct-Session-Id, Called-Station-ID=AP-MAC: AP-GROUP-NAME, Calling-Station-ID=UE MAC, NAS-IP-Address, NAS-ID.

At step 206, the AP Gateway [142] transmits the at least one subscriber identifier to the packet gateway [144]. Further, the AP Gateway [142] transmits details such as Session-Id, Auth-Application-Id, Origin-Host, Origin-Realm, Destination-Host, Destination-Realm, Auth-Request-Type (AUTHORIZE_AUTHENTICATE), EAP-Payload, User-Name (NAI), Calling-Station-ID, RAT-Type (WLAN). Further, the authentication server [148] may fetch the subscriber information such as a profile and authentication vectors from the home subscriber server [146] over SWx using MAR. Thereafter, the authentication server [148] may look-up the IMSI of the subscriber based on the received at the subscriber identity (root NAI or pseudonym) and include the EAP-AKA as "requested authentication" method in the request sent to the HSS. Furthermore, the home subscriber server [146] may generate authentication vectors with AMF separation bit=0 and send them back to the 3GPP AAA server. The HSS sends the Multimedia-Auth-Answer MAA (Session-Id, Result-Code, Auth-Session-State (NO_STATE_MAINTAINED), Origin-Host, Origin-Realm, User-Name (IMSI-NAI), SIP-Number-Auth-Items (5), SIP-Auth-Data-Item {SIP-Item-Number, SIP20 Authentication-Scheme (EAP-AKA), SIP-Authenticate, SIP-Authorization, Confidentiality-Key, Integrity-Key}).

At step 208, the atheization server may transmit an atheization request to the user equipment [110]. The process of authentication involves, the authentication server [148] to initiate an authentication challenge and responds with DEA (Session-Id, User-Name, Auth-Request-Type, EAP-Payload) to the AP Gateway [142]. Thereafter, the AP Gateway [142] transmits the Radius Access-Challenge (EAP-AKA AKAChallenge) to the access point [120], wherein the access point [120] transmits the EAP-Request Challenge (EAP Payload to the user equipment [110]. Thereafter, the user equipment [110] checks the authentication parameters and responds to the authentication challenge to the access pint in EAP-Response Challenge. Subsequently, The access point [120] transmits a RADIUS Access Request (AKA-Challenge) to the AP Gateway [142] and forwarded to the authentication server [148] through DER comprising Session-Id, Auth-Application-Id, Origin-Host, Origin-Realm, Destination-Host, Destination-Realm, Auth-Request-Type (AUTHORIZE_AUTHENTICATE), EAP-Payload, User-Name (NAI), RAT-Type (WLAN), Calling-Station-ID, ANID.

At step 210, the atheisation server updates the home subscriber server [146] with the authentication server [148] address for the authenticated subscriber along with the at the one subscriber identity. The authentication server [148] transmits server-Assignment-Request including but not limited to, session-Id, Auth-Session-State (NO_STATE_MAINTAINED), Origin-Host, Origin-Realm, Destination-Host, Destination-Realm, User-Name (IMSI), Server-Assignment-Type (AAA_USER_DATA_REQUEST).

At step 212, the home subscriber server [146] transmits an APN name, and packet gateway [144] identifier, which further includes a server-Assignment-Answer comprising Session-Id, Result-Code, User-Name, Non-3GPP-User-Data {Subscription-ID (END_USER_E164, MSISDN), Non-3GPP-IP-Access (NON_3GPP_SUBSCRIPTION_ALLOWED), Non-3GPP-IPAccess-APN (Non_3GPP_APNS_ENABLE), APN-Configuration})

At step 214, the authentication server [148] may modify the APN name received from the home subscriber server [146] to a new modified APN name and send to the AP Gateway [142] for further processing. Further, the authentication sends an EAP success (Session-Id, Auth-Application-Id: 16777264, Result-Code, Origin-Host, Origin-Realm, Auth-Request-Type (AUTHORIZE_AUTHENTICATE), EAP-Payload, User-Name (0<IMSI>@mnc001.mcc208.3gppnetwork.org), EAP-Master-Session-Key, APN-Configuration (Context-Identifier, PDN-Type: IPv4v6, Service-Selection (apn name)), Auth-Session-State: STATE_MAINTAINED, Origin-State-Id). At step 216, the AP Gateway [142] selects a packet gateway [144] based on a packet gateway [144] identifier received from the home subscriber server [146] and sends the GTPv2 Create_Session_Request with the modified APN received from the authentication server [148] via S2a interface. Thereafter, the packet gateway [144] sends an AAR {Session-ID, PGW-FQDN, IMSI-NAI, APN, RAT-Type (WLAN)} to the authentication server [148] to authorize the packet gateway [144] for the subscriber and to update the packet gateway [144] identifier on the home subscriber server [146] for the APN name.

At step 218, the authentication server [148] updates the modified APN with the APN name which was received from the home subscriber server [146] and updates the home subscriber server [146] with the packet gateway [144] identifier for the APN name and retrieves Subscriber-APN profiles from the home subscriber server [146]. The authentication server [148] sends the Server-Assignment-Request comprising Session-Id, Auth-Session-State (NO_STATE_MAINTAINED), Origin-Host, Origin-Realm, Destination-Host, Destination-Realm, Service-Selection (APN), Context-Identifier (APN Configuration), Visiting-Network-Identifier (PGW PLMN ID), User-Name (IMSINAI), Server-Assignment-Type (PGW_UPDATE). The home subscriber server [146] sends Server-Assignment-Answer (Session-Id, Result-Code, Experimental-Result (Vendor-Id, Experimental-Result-Code)). Further, the authentication server [148] sends the authentication request {Base AVPs, [Idle-Timeout], [Authorization-15 Lifetime], [Auth-Grace-Period], [Auth-Session-State], [Session-Timeout], Charging-Gateway-Function-Host, Charging-Group-Id, Server-Name, Subscription-Id (IMSI-NAI), [Framed-Pool] [Framed-IPv6-Pool]}. Thereafter, The packet gateway [144] allocates an IP address session and responds back to the AP Gateway [142] with a Create Session Response (Cause, F-TEID, PGW S2a Address C-plane, 20 PAA, [APN-AMBR], APCO (DNS Address), Bearer Contexts Created (EPS Bearer ID, Cause, S2a-U PGW F-TEID, Bearer Level QoS), [Recovery]) message, and in return, The AP Gateway [142] sends a RADIUS Access-Accept (User-Name (NAI), EAP-Success) such that the access point [120] sends Association Response to the user equipment [110] which indicates that the user equipment [110] is successfully associated with EAP-AKA SSID for enabling to offload date from the 3GPP session to non-3GPP session such as Wi-Fi based services.

Figure 3:
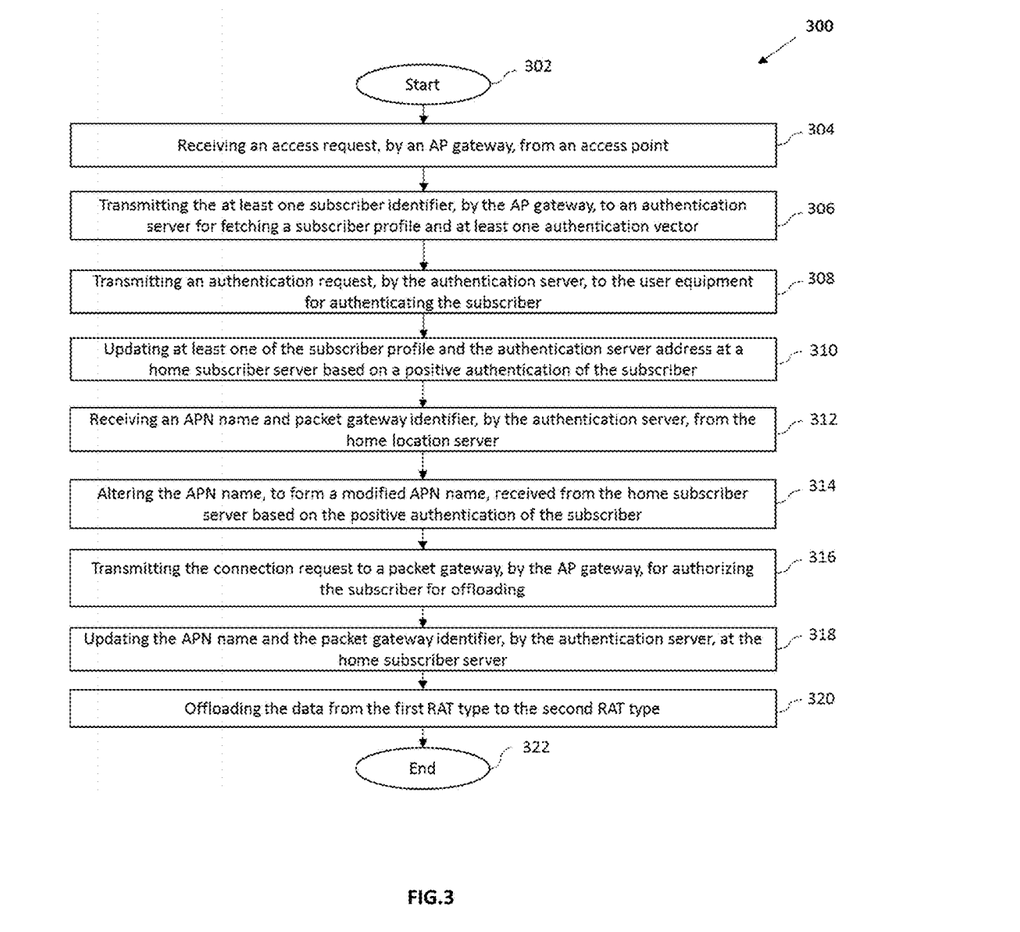
FIG. 3 illustrates an exemplary method flow diagram [300] for offloading data of a subscriber from a first RAT type to a second RAT type, wherein the method being performed by a network entity [140], in accordance with a first embodiment of the present disclosure.

As illustrated in FIG. 3, the present disclosure illustrates an exemplary method flow diagram [300] for offloading data of a subscriber from a first RAT type to a second RAT type, in accordance with a first embodiment of the present disclosure, wherein the method being performed by the network entity [140]. The method flow initiates at step 302.

At step 304, the AP Gateway [142] receives an access request, from the access point [120], wherein the access request may be received, by the access point [120], based on a connection request received from a user equipment [110] and the access request and the connection request may comprise at least one subscriber identifier.

At step 306, the AP Gateway [142] transmits the at least one subscriber identifier to an authentication server [148] for fetching a subscriber profile and at least one authentication vector, wherein the authentication server [148] may comprises an authentication server [148] address. The subscriber profile and the at least one authentication vector may be fetched from a home subscriber server [146].

At step 308, the authentication server [148] transmits an authentication request to the user equipment [110] for authenticating the subscriber. The authentication request may comprise a payload data, the subscriber profile and the at least one authentication vector and may be transmitted to the user equipment [110] via the AP Gateway [142].

At step 310, the authentication server [148] updates at least one of the subscriber profile and the authentication server [148] address, at the home subscriber server [146] based on a positive authentication of the subscriber. Further, the positive authentication of the subscriber may be based on the at least one subscriber identifier.

At step 312, the authentication server [148] receives an APN name and packet gateway [144] identifier from the home subscriber server [146]. Further, the APN name and the packet gateway [144] identifier may be generated based on at least one of the user profile and the at least one authentication vector.

At step 314, the authentication server [148] alters the APN name, to form a modified APN name, received from the home subscriber server [146] based on the positive authentication of the subscriber.

At step 316, the AP Gateway [142] transmits the connection request to a packet gateway [144] for authorizing the subscriber for offloading, wherein the connection request comprises the modified APN name received from the authentication server [148]. Also, the packet gateway [144] selected for transmitting the connection request may be based on the packet gateway [144] identifier.

At step 318, the authentication server [148] updates the APN name and the packet gateway [144] identifier at the home subscriber server [146].

At step 320, the user equipment [110] via the AP Gateway [142] offloads the data from the first RAT type to the second RAT type, wherein the data is identified based on the subscriber profile. Moreover, the offloading of the data from the first data session to the second data session is based on an updation of the modified APN name and the packet gateway [144] identifier at the home subscriber server [146]. Then, the method [300] may end at step 322.

Figure 4:
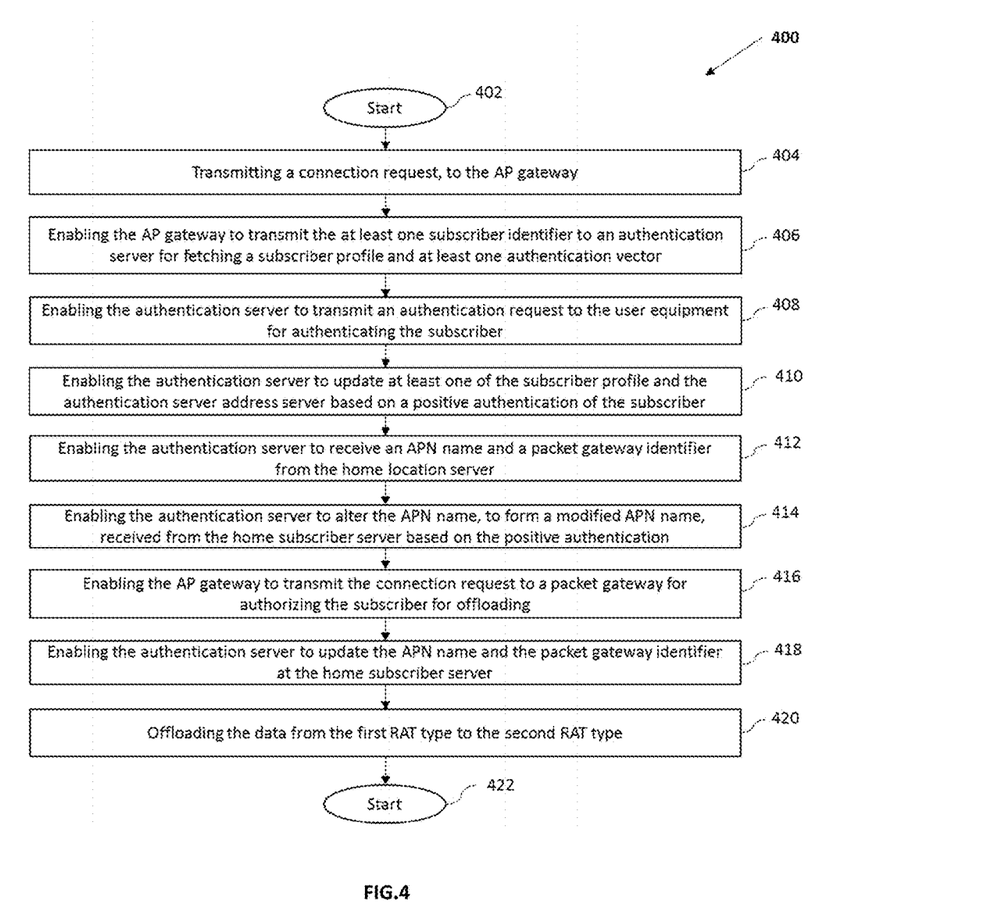
FIG. 4 illustrates an exemplary method flow diagram [400] for offloading data of a subscriber from a first RAT type to a second RAT type, wherein the method being performed by a user equipment [110], in accordance with a second embodiment of the present disclosure.

As illustrated in FIG. 4, the present disclosure illustrates an exemplary method flow diagram [400] for offloading data of a subscriber from a first RAT type to a second RAT type, in accordance with a second embodiment of the present disclosure, wherein the method being performed by the user equipment [110]. The method flow initiates at step 402.

At step 404, the user equipment [110] transmits a connection request, to the AP Gateway [142], wherein the connection request is transmitted via an access point [120], and the connection request comprises at least one subscriber identifier.

At step 406, the user equipment [110] enables the AP Gateway [142] to transmit the at least one subscriber identifier to an authentication server [148] for fetching a subscriber profile and at least one authentication vector, wherein the authentication server [148] may comprise an authentication server [148] address.

At step 408, the user equipment [110] enables the authentication server [148] to transmit an authentication request to the user equipment [110] for authenticating the subscriber.

At step 410, the user equipment [110] enables the authentication server [148] to update at least one of the subscriber profile and the authentication server [148] address at a home subscriber server [146] based on a positive authentication of the subscriber.

At step 412, the user equipment [110] enables the authentication server [148] to receive an APN name and a packet gateway [144] identifier from the home subscriber server [146].

At step 414, the user equipment [110] enables the authentication server [148] to alter the APN name, to form a modified APN name, received from the home subscriber server [146] based on the positive authentication of the subscriber.

At step 416, the user equipment [110] enables the AP Gateway [142] to transmit the connection request to a packet gateway [144] for authorizing the subscriber for offloading, wherein the connection request may comprise the modified APN name received from the authentication server [148].

At step 418, the user equipment [110] enables the authentication server [148] to update the APN name and the packet gateway [144] identifier at the home subscriber server [146].

At step 420, the user equipment [110] offloads the data from the first RAT type to the second RAT type, wherein the data is identified based on the subscriber profile. Then, the method [300] may end at step 422.

Although, the present disclosure has been described with respect to the exemplary system architecture and any units, interfaces, modules, and components depicted in the figures and described herein may be present in the form of a hardware, a software and a combination thereof. Connection/s shown between these units/components/modules/interfaces in the exemplary system architecture, the network entity [140], the access point [120], and the user equipment

[110] are exemplary and any units/components/module/interface in the exemplary system architecture, the network entity [140], the access point [120], and the user equipment [110] may interact with each other through various logical links and/or physical links. Further, the units/components/modules/interfaces may be connected in other possible ways. Though a limited number of the network entity [140] with the cellular coverage range, the user equipment [110]s present in the cellular coverage range, the access points [120] units, interfaces, modules and components, have been shown in the figures; however, it will be appreciated by those skilled in the art that the exemplary system architecture including the network entity [140], the access point [120], and the user equipment [110] of the present disclosure encompasses any number and varied types of the entities/elements.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

What is claimed is:

1. A method for offloading data of a subscriber from a first radio access technology type to a second radio access technology type, the method being performed by a network entity, the method comprising:
   receiving an access request, by an access point Gateway, from an access point, wherein
      the access request is received, by the access point, based on a connection request received from a user equipment, and
      the access request and the connection request comprise at least one subscriber identifier;
   transmitting the at least one subscriber identifier, by the access point Gateway, to an authentication server;
   fetching a subscriber profile and at least one authentication vector from the authentication server based on the at least one subscriber identifier, wherein the authentication server comprises an authentication server address;
   transmitting an authentication request, by the authentication server, to the user equipment to authenticate the subscriber;
   updating at least one of the subscriber profile and the authentication server address, by the authentication server, at a home subscriber server based on a positive authentication of the subscriber;
   receiving an access point name and packet gateway identifier, by the authentication server, from the home location server;
   altering the access point name, to form a modified access point name, received from the home subscriber server based on the positive authentication of the sub scriber;
   transmitting the connection request to a packet gateway, by the access point Gateway, to authorize the subscriber for offloading, wherein the connection request comprises the modified access point name received from the authentication server;
   updating the access point name and the packet gateway identifier, by the authentication server, at the home subscriber server; and
   offloading the data from the first radio access technology type to the second radio access technology type, wherein the data is identified based on the sub scriber profile.

2. The method as claimed in claim 1, wherein the subscriber profile and the at least one authentication vector are fetched from a home subscriber server.

3. The method as claimed in claim 1, wherein the authentication request is transmitted to the user equipment via the access point Gateway.

4. The method as claimed in claim 1, wherein the packet gateway is selected based on the packet gateway identifier.

5. The method as claimed in claim 1, wherein the authentication request comprises a payload data, the subscriber profile and the at least one authentication vector.

6. The method as claimed in claim 1, wherein the positive authentication of the subscriber is based on the at least one subscriber identifier.

7. The method as claimed in claim 1, wherein the access point name and the packet gateway identifier is generated based on at least one of the user profile and the at least one authentication vector.

8. The method as claimed in claim 1, wherein the offloading of the data from the first data session to the second data session is based on an updation of the modified access point name and the packet gateway identifier at the home subscriber server.

9. A network entity for offloading data a subscriber from a first radio access technology type to a second radio access technology type, the network entity comprising:
   an access point Gateway configured to:
      receive an access request from an access point, wherein
         the access request is received based on a connection request received from a user equipment, and
         the access request and the connection request comprise at least one subscriber identifier,
      transmit the at least one subscriber identifier to an authentication server;
   the authentication server configured to:
      fetch a subscriber profile and at least one authentication vector based the at least one subscriber identifier, wherein the authentication server comprises an authentication server address;
      transmit an authentication request to the user equipment to authenticate the subscriber,
      update at least one of the subscriber profile and the authentication server address at a home subscriber server based on a positive authentication of the subscriber,
      receive an access point name and a packet gateway identifier from the home location server, and
      alter the access point name, to form a modified access point name, received from the home subscriber server based on the positive authentication of the subscriber;
   the access point Gateway further configured to transmit the connection request to a packet gateway to authorize the subscriber for offloading, wherein the connection request comprises the modified access point name received from the authentication server; and
   the authentication server further configured to update the access point name and the packet gateway identifier, at the home subscriber server, wherein the data is offloaded from the first radio access technology type to the second radio access technology type based on the subscriber profile.

10. A method for offloading data of a subscriber from a first radio access technology type to a second radio access technology type, the method being performed by a user equipment, the method comprising:
- transmitting a connection request, to the access point Gateway, wherein
  - the connection request is transmitted via an access point, and
  - the connection request comprises at least one subscriber identifier;
- enabling the access point Gateway to transmit the at least one subscriber identifier to an authentication server;
- fetching a subscriber profile and at least one authentication vector from the authentication server based on the at least one subscriber identifier, wherein the authentication server comprises an authentication server address;
- enabling the authentication server to transmit an authentication request to the user equipment to authenticate the subscriber;
- enabling the authentication server to update at least one of the subscriber profile and the authentication server address at a home subscriber server based on a positive authentication of the subscriber;
- enabling the authentication server to receive an access point name and a packet gateway identifier from the home location server;
- enabling the authentication server to alter the access point name, to form a modified access point name, received from the home subscriber server based on the positive authentication of the subscriber;
- enabling the access point Gateway to transmit the connection request to a packet gateway for authorizing to authorize the subscriber for offloading, wherein the connection request comprises the modified access point name received from the authentication server;
- enabling the authentication server to update the access point name and the packet gateway identifier at the home subscriber server; and
- offloading the data from the first radio access technology type to the second radio access technology type, wherein the data is identified based on the subscriber profile.

11. A user equipment for offloading data of a subscriber from a first radio access technology type to a second radio access technology type, the user equipment configured to:
- transmit a connection request, to the access point Gateway, wherein
  - the connection request is transmitted via an access point, and
  - the connection request comprises at least one subscriber identifier;
- enable the access point Gateway to transmit the at least one subscriber identifier to an authentication server;
- enable the authentication server to fetch a subscriber profile and at least one authentication vector based on the at least one subscriber identifier, wherein the authentication server comprises an authentication server address;
- enable the authentication server to transmit an authentication request to the user equipment to authenticate the subscriber;
- enable the authentication server to update at least one of the subscriber profile and the authentication server address at a home subscriber server based on a positive authentication of the subscriber;
- enable the authentication server to receive an access point name and a packet gateway identifier from the home location server;
- enable the authentication server to alter the access point name, to form a modified access point name, received from the home subscriber server based on the positive authentication of the subscriber;
- enable the access point Gateway to transmit the connection request to a packet gateway to authorize the subscriber for offloading, wherein the connection request comprises the modified access point name received from the authentication server;
- enable the authentication server to update the access point name and the packet gateway identifier at the home subscriber server; and
- offload the data from the first radio access technology type to the second radio access technology type, wherein the data is identified based on the subscriber profile.

* * * * *